Jan. 2, 1951
P. DUCANIS
2,536,920
WORM GEARING
Filed July 14, 1949
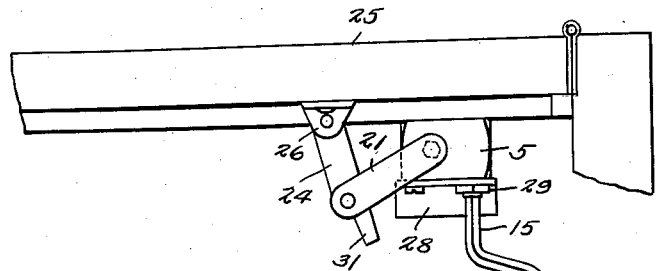
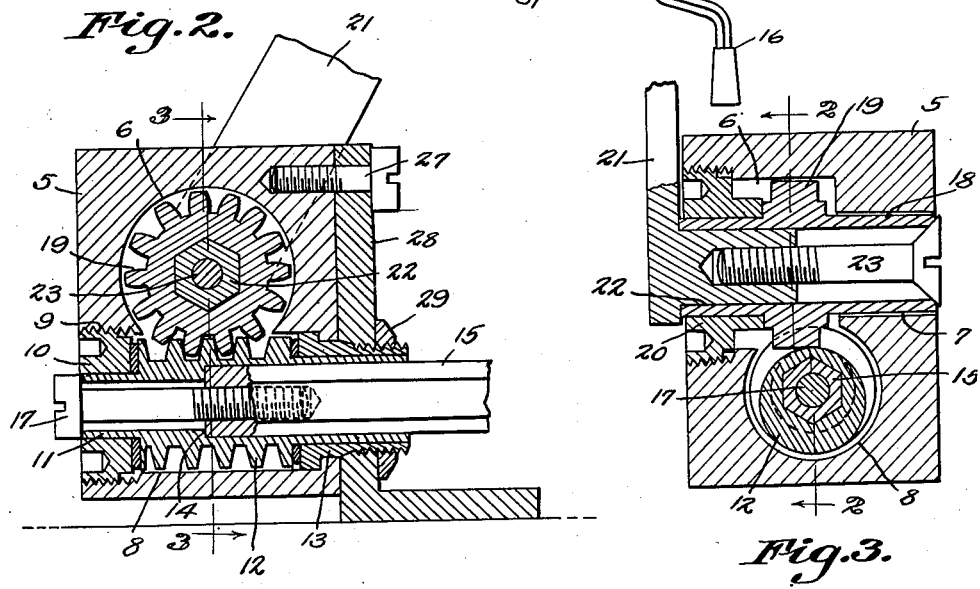
Paul Ducanis
INVENTOR
BY CA Snow & Co.
ATTORNEYS.

Patented Jan. 2, 1951

2,536,920

UNITED STATES PATENT OFFICE 2,536,920

WORM GEARING

Paul Ducanis, Miami, Fla.

Application July 14, 1949, Serial No. 104,651

1 Claim. (Cl. 74—425)

This invention relates to a closure operator, the primary object of the invention being to provide a closure operator wherein all moving parts are sealed within a housing, and protected from the elements.

Another object of the invention is to provide a closure operator which is compact and is designed primarily for positioning where space is limited, the operator being positioned for operating in either a vertical or horizontal position.

Another important object of the invention is to provide a closure operator wherein all the moving parts thereof are mounted within a lubricant tight casing, the lubricant being packed within the casing when the unit is assembled.

Still another object of the invention is to provide a closure operator which may be used in operating left or right closures, without making changes in the unit for installation.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing

Figure 1 is a fragmental plan view illustrating a closure operator constructed in accordance with the invention, as mounted for operating a swinging closure.

Fig. 2 is a sectional view taken on line 2—2 of Fig. 3.

Fig. 3 is a sectional view taken on line 3—3 of Fig. 2.

Fig. 4 is an elevational view of one form of knob used in operating the main shaft of the closure operator.

Referring to the drawing in detail, the operator comprises a solid metal block constructed preferably of aluminum or brass, indicated by the reference character 5, the block constituting the body portion of the operator. The body portion is machined to provide the opening 6 that extends from one side of the body portion to the other, the opening 6 having the reduced end 7.

The block is further machined to provide the opening 8 which is formed with internal threads 9 at one end thereof, which threads accommodate the bearing member 10 in which the extension 11 at one end of the worm gear 12, operates, the worm gear 12 also operating in the bearing 13 which is fitted within the opposite end of the opening 8, as clearly shown by Fig. 2 of the drawing.

As clearly shown by Fig. 2 of the drawing the worm gear 12 is formed with a longitudinally disposed bore provided with a shoulder 14 at a point substantially intermediate the ends of the bore against which one end of the shaft 15 of the operating handle 16 engages, the end of the shaft 15 being formed with a threaded bore in which the screw 17 extends, the screw 17 acting to draw the shaft 15 into close engagement with the shoulder 14 when the operator has been assembled. The shaft 15 is of hexagonal construction and fits within the correspondingly formed opening formed within the worm gear, providing a connection which will insure rotation of the worm gear 12, when the shaft 15 is rotated.

The opening 6 accommodates the tubular shaft 18 on which the gear 19 is formed, the gear 19 meshing with the worm gear 12, as clearly shown by the drawing.

One end of the tubular shaft 18 extends into the bearing 20 that is formed with external threads which mesh with internal threads formed in the wall of the opening 6, adjacent to one end thereof, the gear 19 engaging one end of the bearing 20, to hold the shaft 18 within the opening 6.

The operating arm 21 is formed with a right angled hollow end portion 22 that fits into the hexagonally shaped end of the tubular shaft 18, the right angled end 22 being also hexagonally shaped so that the end 22 of the operating arm and hollow shaft 18, will be held together, so that rotary movement of the shaft 18, will result in a relative movement of the arm 21.

The right angled end 22 of the operating arm is formed with a threaded bore extending inwardly from the free end thereof, the bore accommodating the bolt 23 that extends into one end of the tubular shaft 18, the bolt operating to draw the right angled end 22 of the operating arm into the hollow shaft 18.

The reference character 24 indicates the connecting link which is used between the operating arm 21 and the closure 25, the link 24 being pivotally connected to the closure, through the bracket 26, which is secured to the closure 25.

The body portion is provided with a threaded opening for the reception of the bolt 27 by means of which a bracket such as indicated at 28 may be secured to the body portion or housing of the device, the bracket constituting means whereby the body portion may be secured to a supporting surface. When a bracket such as indicated at 28 is used, a nut 29 is positioned over the extended end of the bearing 13, securing the bearing in position and insuring a close fit between the elements of the operator.

As previously stated, the operator is controlled by the movement of the operating handle 16. However, it may be found desirable to use an operating handle such as indicated by Fig. 4 of the drawing, in lieu of the handle 16. In using the operating handle as shown by Fig. 4 of the drawing, the operating handle embodies a shank 30 which is formed with a threaded bore to accommodate the screw 17 securing the handle in position, much in the same manner as the handle 16.

From the foregoing it will be seen that due to the construction shown and described, I have provided a closure operating device wherein all the moving parts thereof are completely encased in the body portion, where they are protected against the elements. It will further be seen that because of the construction of the body portion, the body portion may be packed with lubricating material when the operator is assembled, rendering it unnecessary to lubricate the moving parts of the operator, during the life of the operator.

As shown by Fig. 1 of the drawing, the link 24 is provided with an extension 31 which is adapted to move into engagement with one side of the body portion or housing 5 restricting outward swinging movement of the closure operated by the device, beyond a predetermined point.

Having thus described the invention, what is claimed is:

In a closure operator, a body portion in the form of a block having an opening extending therethrough, said opening having a reduced end providing a bearing, a hollow shaft having a gear formed intermediate its ends, positioned in the opening with one end operating in said bearing, a removable bearing threaded in one end of said opening in which one end of the hollow shaft operates, said threaded bearing engaging the gear of said hollow shaft restricting end thrust of the shaft in one direction, said block having a second opening extending at right angles to the first mentioned opening communicating with the first mentioned opening, a worm mounted within the second opening meshing with the gear on the hollow shaft operating the gear on the hollow shaft as the worm operates, and removable bearings mounted within the latter opening in which the worm operates, said removable bearings closing the ends of said openings, and means for securing an operating shaft to said worm.

PAUL DUCANIS.

REFERENCES CITED

The following references are of record in the file of this patent:

UNITED STATES PATENTS

| Number | Name | Date |
|---|---|---|
| 1,095,682 | Smyser | May 5, 1914 |
| 1,692,073 | Brenner | Nov. 20, 1928 |
| 1,744,341 | Spencer et al. | Jan. 21, 1930 |
| 2,220,537 | Murrin | Nov. 5, 1940 |
| 2,299,338 | Meyer | Oct. 20, 1942 |
| 2,337,913 | McClearen | Dec. 28, 1943 |
| 2,373,197 | Ostrander | Apr. 10, 1945 |